M. R. MOORE.
Assignor to the PNEUMATIC COMPANY.
MACHINERY FOR MAKING MOLDS FOR CASTING.
No. 10,562. Reissued Feb. 24, 1885.
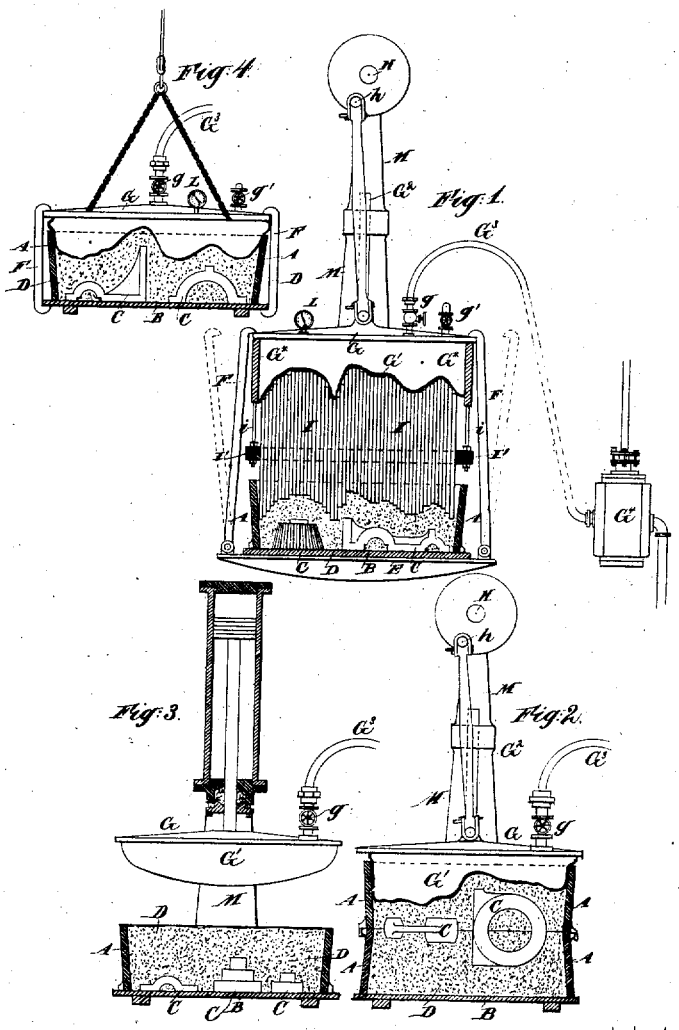
WITNESSES—
Charles R. Searle.
J. C. Renwick
INVENTOR—
Matthew R. Moore
by his attorney Thomas D. Stetson.

UNITED STATES PATENT OFFICE.

MATTHEW R. MOORE, OF INDIANAPOLIS, INDIANA, ASSIGNOR TO THE PNEUMATIC COMPANY, OF SAME PLACE.

MACHINERY FOR MAKING MOLDS FOR CASTINGS.

SPECIFICATION forming part of Reissued Letters Patent No. 10,562, dated February 24, 1885.

Original No. 302,349, dated July 22, 1884. Application for reissue filed October 11, 1884.

*To all whom it may concern:*

Be it known that I, MATTHEW R. MOORE, of the city of Indianapolis, in the county of Marion and State of Indiana, have invented a new and useful Improvement in Machinery for Making Molds for Castings, of which the following is a specification.

My improvement relates to that part of the operation of making molds for castings known as "tamping the molds," sometimes termed "ramming." This operation, the proper compacting of the material technically known as "sand," as is well known by practical founders, is a most essential part of the molder's art, for if any part of the material be not sufficiently compressed it will not keep in place, but is liable to break down or be washed out by the inflow of the melted metal, and if any part be compacted too hard it will not be sufficiently porous to permit the escape of contained air and the vapor given off by the melted metal; and the casting produced will be unsound.

In the operation of molding, success depends on the skill and judgment of the workman. Machinery has before been devised for the performance of this operation, which could be made to produce uniform and perfect results if it were not for the unevenly distributed space in the mold occupied by the patterns. These being of various and irregular shapes, cause the sand of the mold to vary in thickness, and all parts of the mold being subjected by the machine to the same amount of compression, the thinner portions are compacted harder than the thicker. It has been found impracticable, therefore, to make molds from patterns of any great variety of thickness by means of any appliances hitherto invented. By the use of my improvement, however, it is practicable to give the same degree of compactness to every part of the mold, whether thick or thin, so that uniform and perfect results may be obtained from any variety or dimensions of patterns. I employ a flexible diaphragm or yielding cushion of rubber or other suitable material containing air, water, or other fluid or plastic substance, through which the pressure is transmitted to the mold. This I use either alone or in combination with pistons or rammers intermediate between it and the sand, as hereinafter described. The whole surface of the mold may by this means be subjected to a uniform pressure; but compression only takes place in proportion to the thickness of the material to be compacted, and the result is a mold of uniform density or hardness.

The accompanying drawings form a part of this specification, and represent what I consider the best means of carrying out the invention.

Figure 1 is a vertical section through the machine in what I consider its most complete form. The remaining figures represent modifications. Fig. 2 shows the apparatus as arranged without the intermediate rammers, but allowing the flexible diaphragm to act directly on the sand. Fig. 3 shows the same with provisions for working the cover up and down by fluid applied to the piston in a cylinder above. Fig. 4 shows the apparatus without any means for forcing down the cover. In this form the compression of the sand depends on forcing in the fluid above.

Similar letters of reference indicate corresponding parts in all the figures where they occur.

When the half of a flask or mold has been filled level full of sand not yet compacted, and then its upper surface evenly compressed through a space of, say, two inches, as by means of a rigid piston, which fills the top of the flask, those portions of the sand which lie above the thicker parts of the pattern would be more compacted than those over the thinner parts, or those parts of the flask not occupied by the patterns. Sand, unlike fluids, transmits pressure in direct lines, and not laterally to much extent. But instead of the solid rigid piston, or its equivalent, as employed in molding-machines hitherto devised, I employ a strong movable cover, which I will term a "platen," faced with a diaphragm or cushion of flexible material, loosely filled with air or other fluid, which diaphragm may be brought down upon the sand with sufficient force. The flexible diaphragm will so distribute the pressure that the thinner parts of the sand will only yield until they reach that degree of compactness which will enable them to resist the pressure applied, when they will cease to be further compressed, while the thicker portions will continue to yield until every part of the mold has attained a uniform degree of compactness due to the pressure applied.

Referring to Fig. 1, A is the flask; B, the mold-board; C C, the patterns, and D the sand.

E is a strong supporting-bed, having hooks F, pivoted to points at the sides.

G is a strong movable platen, and G′ a flexible diaphragm, of rubber or other suitable material, tightly attached by its edges, the space between the flexible diaphragm and the rigid platen G being filled with water or other fluid, as required. The platen G is provided with two smooth rods, $G^2$—one near each edge—which traverse in a steadiment provided in a framing, M, and serve as guides to maintain a perfectly-parallel position of the platen while it is propelled up and down by the connection to a crank-pin, *h*, rotated by a shaft, H, operated by a steam-engine or other suitable power. (Not shown.)

$G^3$ is a flexible pipe, leading water or other fluid from the pump $G^4$, or from an elevated reservoir or other efficient means of furnishing fluid under pressure. It is controlled by a valve. Another valve, *g*′, serves as a means for discharging whenever it is desired to collapse the diaphragm. As here shown, the platen G is provided with a stout rim, G*, projecting downward a considerable distance on all sides.

I I are a series of bars, of hard wood or other suitable material, laid side by side and gently compressed together by an encircling clamp I′, which is, by rods *i*, suspended to the platen. The pressure of the clamp I′ on the bars I should be sufficient to overcome the gravity and cause them to rise with each elevation of the platen, but not so great as to forbid their easily accommodating themselves to varying conditions in the sand below.

To operate the invention, the flask A, having patterns C, and filled with molding-sand of the proper composition and dampness, not rammed, is brought into position on the bed E, while the platen G with its attachment is in its elevated position. Then the shaft H is turned and the platen caused to descend. It is arrested with the crank near its lowest position, and the hooks F are moved inward and caused to engage over the edge of the platen. Then the valve *g* is opened by the attendant, and fluid flows through the pipe $G^3$ into the space between the platen G and the flexible diaphragm G′, creating a uniform high pressure there, urging the bars I down upon the sand. The valve is closed, the hooks F are moved outward again and disengaged, and the shaft is turned rapidly. This depresses and elevates the platen and its attachments as many times as may be desired, striking a series of blows, pressing the lower ends of the bars upon the sand. The sand yields irregularly, the bars being all urged down uniformly by the uniform pressure of the fluid on the diaphragm. Those bars which come over a high part of the pattern press the sand down but little, while those which come over a thin portion press it down farther. The clamp I′ allows the bars to change their positions as required, and ultimately all come to rest in the required irregular position. After the sand has been thus compressed, first by direct pressure and then by the blows, the valve *g*′ is opened, and a large portion of the fluid is allowed to escape. The shaft is turned to bring its crank-pin *h* into the highest position, thus correspondingly elevating the platen and its attachments, and the flask is removed. An inverted box or analogous device having a plane upper surface is now introduced in place of the flask, and by striking one blow the bars are again evened and brought all to a uniform level. Then, removing that plane device and introducing the next flask, the crank is again depressed, the hooks are again engaged, the pressure of the fluid again applied, and the operation is repeated. After each flask is removed, with a liberal quantity of sand properly compressed in immediate contact with the pattern, the irregular upper surface may be easily evened by adding more molding-sand, rammed, and the operation is complete.

L is a gage by which the amount of pressure induced by the fluid is indicated.

Fig. 3 shows a different application of my elastic or yielding platen, where the sand or molding material is compacted by beating alone.

Fig. 4 shows the elastic diaphragm as used when pressure is applied by forcing in water, compressed air, steam, or other fluid, conveyed to its interior through a hose, as shown, the pressure being regulated by means of a valve, *g*, and indicated by a pressure-gage, L. In this case the cover having the diaphragm attached must be clamped to the flask, and for convenience may be suspended from a crane.

In any of the applications shown the flexible diaphragm and platen may be made sectional or multiple, consisting of any number of diaphragms, separate or conjoined, and operating independently or together, as may be best adapted to the work. Thus, in Fig. 3, the platen and cylinder might be replaced by any number of smaller platens and cylinders aggregately equivalent and operating independently or simultaneously. So, also, in the other applications shown, I do not confine myself to the use of the yielding platen or diaphragm singly, nor to any particular multiple of it. The sectional or multiple form affords convenient means of adaptation to molds of different sizes.

I can use the elastic diaphragm or platen as shown, or I can combine it with any other suitable machinery for filling the flasks with sand or molding material, automatically or otherwise, and for placing and withdrawing the patterns and handling the completed mold, and I propose to use any and all such applications and combinations as required.

Modifications may be made in the proportions and arrangements of various parts. The hooks may be applied on all sides, or only on two sides. For the latter purpose it is preferable to arrange them on the two sides adjacent to the uprights of the framing, leaving liberal clear spaces on the other two sides through which to introduce and remove the flasks.

My invention may be operated to give successive blows while the last installment of sand is being filled in, any convenient mechanism being used to automatically regulate the height of the flask or stroke of the platen to suit the amount of material to be compressed.

In molding a number of similar articles successively, the parallel bars I and the diaphragm need not be evened between the several operations; but, having been made to assume the required relations in treating the first flask, those positions of the bars I I and of the diaphragm G′ relatively to each other may be maintained in ramming all the succeeding flasks.

I claim as my invention—

1. A flexible presser, backed by a fluent or plastic substance and adapted to compress sand, in combination with a flask and a pattern, substantially as and for the purposes set forth.

2. In machinery for making molds, a flexible bag or diaphragm containing air or other fluid, and connections for supplying pressure thereto, combined with a flask and a pattern, as and for the purposes set forth.

3. In machinery for making molds, the combination, with a bag or diaphragm containing a fluid or plastic substance, and with a flask and pattern, of a sectional presser, each section of which is adapted to yield, as and for the purposes set forth.

4. As a means for making molds for castings, a flask, mold-board, and pattern, in combination with each other and with a yielding bag or diaphragm, subject to the pressure of the water or other fluid, arranged to apply a practically uniform pressure on all parts of the sand in the mold, substantially as herein specified.

5. In combination with the flask A and mold-board B, the platen G, having flexible diaphragm G′, means, as $G^3$ $G^4$ $g$, for supplying fluid to said diaphragm, and means, as $g'$, for carrying off such fluid, as herein specified.

6. The combination, with the platen G, having a flexible diaphragm containing fluid, of the shaft H, crank-pin $h$, frame M, and rod $G^2$, and connecting-pitman, substantially as set forth.

7. In a machine for making molds for castings, the combination, with a flask, A, and support or bed E, of a platen, G, hooks or locking means F, flexible diaphragm G′, and provisions, as $G^3$ $G^4$ $g$ $g'$, and connected means for applying fluid-pressure between the diaphragm and the piston, as herein specified.

In testimony whereof I have hereunto set my hand, at Indianapolis, Indiana, this 24th day of September, 1884, in the presence of two subscribing witnesses.

MATTHEW R. MOORE.

Witnesses:
H. H. HANNA,
E. K. MARQUIS.